US012444892B2

(12) United States Patent
Lin et al.

(10) Patent No.: US 12,444,892 B2
(45) Date of Patent: Oct. 14, 2025

(54) CONNECTOR

(71) Applicant: Delta Electronics, Inc., Taoyuan (TW)

(72) Inventors: Cheng-Yi Lin, Taoyuan (TW); Ting-Yun Lu, Taoyuan (TW); Yi-Chih Hsu, Taoyuan (TW); Sheng-Yu Wen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 342 days.

(21) Appl. No.: 18/096,672

(22) Filed: Jan. 13, 2023

(65) Prior Publication Data

US 2024/0006828 A1 Jan. 4, 2024

(30) Foreign Application Priority Data

Jun. 30, 2022 (CN) ......................... 202210769463.9

(51) Int. Cl.

*H01R 24/60* (2011.01)
*H01R 13/05* (2006.01)
*H01R 13/502* (2006.01)
*H01R 13/53* (2006.01)

(52) U.S. Cl.

CPC ............. *H01R 24/60* (2013.01); *H01R 13/05* (2013.01); *H01R 13/502* (2013.01); *H01R 13/53* (2013.01)

(58) Field of Classification Search

CPC ...... H01R 13/05; H01R 13/502; H01R 13/53; H01R 13/641; H01R 24/60
USPC ...................................... 439/660, 489, 924.1
See application file for complete search history.

(56) References Cited

U.S. PATENT DOCUMENTS 6,916,188 B2 * 7/2005 Lang .................. H01R 13/6471 439/607.17
7,204,718 B2 * 4/2007 Lai ......................... H01R 27/00 439/924.1
7,611,386 B1 * 11/2009 Zhang .................. H01R 13/658 439/924.1
8,043,123 B2 * 10/2011 Hsieh ..................... H01R 13/04 439/669

(Continued)

FOREIGN PATENT DOCUMENTS

CN 102075090 B 3/2014
CN 106159582 A 11/2016

(Continued)

*Primary Examiner* — Gary F Paumen
(74) *Attorney, Agent, or Firm* — KIRTON McCONKIE; Evan R. Witt

(57) ABSTRACT

A connector is disclosed and includes a housing base, a conductive terminal, a signal terminal and a protrusion. A sleeve of an electronic device end sleeves on the housing base through an opening end along a first direction and slides a first displacement distance, plural contact pins of the electronic device end slide into the accommodation space through the opening end, and a conductive contact pin of the electronic device end is interfered with the conductive terminal to form an electrical connection. The protrusion is elastically connected to the housing base and penetrates through the housing base. When the sleeve passes through the opening end and slides a second displacement distance greater than the first displacement distance, the protrusion is interfered with the sleeve and drives the signal terminal, so that the signal terminal pushes against a signal contact pin of the electronic device end to form an electrical connection.

20 Claims, 15 Drawing Sheets

(56) References Cited

U.S. PATENT DOCUMENTS

| | | | | |
|---|---|---|---|---|
| 8,715,010 | B2 * | 5/2014 | Wang | H01R 24/60 439/660 |
| 8,961,242 | B2 * | 2/2015 | Kim | H01R 27/00 439/924.1 |
| 9,478,917 | B2 | 10/2016 | Strobl et al. | |
| 2002/0106926 | A1 * | 8/2002 | Lindberg | G06F 1/189 439/342 |
| 2012/0052736 | A1 | 3/2012 | Fukushi | |
| 2014/0051274 | A1 * | 2/2014 | Yu | H01R 13/7031 439/188 |
| 2015/0333432 | A1 | 11/2015 | Wu et al. | |
| 2016/0141817 | A1 | 5/2016 | Wu et al. | |
| 2017/0194755 | A1 | 7/2017 | Cheng et al. | |
| 2017/0222371 | A1 | 8/2017 | Zhang | |
| 2017/0271822 | A1 | 9/2017 | Zhang | |

FOREIGN PATENT DOCUMENTS

| | | | |
|---|---|---|---|
| CN | 104752898 | B | 10/2017 |
| CN | 104752903 | B | 1/2018 |
| CN | 109546427 | B | 3/2020 |
| CN | 109565128 | B | 1/2021 |
| TW | 201537835 | A | 10/2015 |
| TW | 201537845 | A | 10/2015 |
| TW | M512233 | U | 11/2015 |
| TW | I607609 | B | 12/2017 |

* cited by examiner

CONNECTOR

CROSS-REFERENCE TO RELATED APPLICATION

This application claims priority to China Patent Application No. 202210769463.9, filed on Jun. 30, 2022. The entire contents of the above-mentioned patent application are incorporated herein by reference for all purposes.

FIELD OF THE INVENTION

The present disclosure relates to a connector, and more particularly to a high-power and anti-arcing connector for avoiding carbon deposition generated due to the electric arc.

BACKGROUND OF THE INVENTION

Regarding the USB power supply, a USB connector is used to transmit the power form a source to a sink. In the past, several different connector interfaces are used in the various mobile devices, such as laptops and mobile phones, and it results in the incompatibility of various connectors on the market. It further causes other problems such as the application limitation and the resource waste. Therefore, the Type-C connector and the USB PD (Power Delivery) protocol are utilized for the PD power supply of various mobile devices in the current market, and the data transmission, the power supply and power reception, and the video signal communication between the mobile devices and the peripheral storage devices are accomplished through one Type-C connector.

Due to the convenience of use, the Type-C connector is widely used in the high-power power transmission and the quick-charging applications. The power delivery is completed by the user's plugging and unplugging action. However, in the context of the high-power power transmission and the quick-charging applications, the power is transmitted directly and instantaneously from the source to the sink at a large flow. If any user unplugs the connector connected between the source and the sink inappropriately, carbon deposition is easily generated at the conductive terminals due to the electric arc, and the temperature may rise too high. That is, carbon deposition may cause higher contact resistance and temperature raised due to the heat generated which could lead to the safety concern, and even an instant arcing. As accumulated over time, the service life of the connector is degraded, and the safety problems in use are caused.

Therefore, there is a need of providing a connector for decreasing the voltage in advance before the removal of the connector from the electronic device end is completed, so as to avoid the occurrence of the electric arc during hot swapping, avoid the formation of the carbon deposition due to the electric arc, prolong the service life of the connector, and obviate the drawbacks encountered by the prior arts.

SUMMARY OF THE INVENTION

An object of the present disclosure is to provide a connector for connecting with an electronic device end. A protrusion elastically connected with the housing base is utilized to control the disconnection sequences of a conductive terminal and a signal terminal with a plurality of contact pins of the electronic device end. When the connector is pulled and separated from the plurality of contact pins of the electronic device end, the protrusion moves back to the original position to release the signal terminal firstly, and the conductive terminal and the conductive contact pin of the electronic device end are maintained in the electrical connection. At this time, the power supply system connected to the connector controls the output voltage to be decreased or stops the output voltage in advance. When the conductive terminal and the conductive contact pin of the electronic device end are separated and disconnected, the potential of the output voltage transmitted between the conductive terminal and the conductive contact pin of the electronic device end has been less than a certain degree. It has advantages of avoiding the occurrence of the electric arc during hot swapping, avoiding the formation of the carbon deposition due to the electric arc, prolonging the service life of the connector and solving the safety problems in use.

Another object of the present disclosure is to provide a connector for connecting with an electronic device end. When a plurality of contact pins of an electronic device end are connected to the connector along a first direction, the electronic device end passes through an opening end of the connector and moves a first displacement distance and a second displacement distance to complete the electrical connections of the conductive terminal and the signal terminal, respectively. Since the first displacement distance is smaller than the second displacement distance, the conductive terminal is electrically connected with the conductive contact pin firstly, and then the signal terminal is electrically connected with the signal contact pin. On the contrary, when the connector is detached and separated from the electronic device end along the first direction, and the displacement distance of the connector relative to the electronic device end is greater than zero and less than the difference between the second displacement distance and the first displacement distance, the signal terminal is disconnected from the signal contact pin, and the conductive terminal is maintained in the electrical connection with the conductive contact pin of the electronic device end. At this time, a controller of a power supply system connected to the connector determines that the connector is in the unplugging operation according to the disconnection state of the signal terminal. Moreover, at the same time, a switch element or a power-off unit is controlled to step down the output voltage or stop the output voltage, so that the output voltage is discharged through a discharge path. Thereafter, when the separation distance is greater than the difference between the second displacement distance and the first displacement distance, the output voltage between the electronic device end and the connector has been stepped down from a high level to a low level, or the output voltage is stopped. With the output voltage at the low level or stopped, the conductive terminal and the conductive contact pin of the electronic device end are disconnected, and it is not easy to cause the electric arc. At the same time, it also avoids the formation of the carbon deposition due to the electric arc, so as to prolong the service life of the connector and solve the safety problems in use.

In accordance with an aspect of the present disclosure, a connector is provided for matching and connecting with an electronic device end. The electronic device end includes a plurality of contact pins and a sleeve, and the sleeve is configured to surround the plurality of contact pins. The connector includes a housing base, a conductive terminal, a signal terminal and a protrusion. The housing base is spatially corresponding to the plurality of contact pins and the sleeve of the electronic device end. The housing base includes an accommodation space and an opening end, and the accommodation space is in communication with an exterior through the opening end. The conductive terminal is disposed in the accommodation space along a first direction, and includes a conductive elastic arm. When the sleeve sleeves on the housing base through the opening end along the first direction and slides a first displacement distance, the plurality of contact pins are slid into the accommodation space through the opening end, and a conductive contact pin of the plurality of contact pins interferes with the conductive elastic arm to form an electrical connection. The signal terminal is disposed in the accommodation space along the first direction and includes a signal elastic arm. The protrusion is elastically connected to the housing base, penetrates through the housing base, and is spatially corresponding to the signal elastic arm. When the sleeve passes through the opening end along the first direction and slides a second displacement distance, the protrusion interferes with the sleeve and inwardly pushes the signal elastic arm, so that the signal elastic arm pushes against a signal contact pin of the plurality of contact pins to form an electrical connection. The second displacement distance is greater than the first displacement distance.

In an embodiment, when the plurality of contact pins and the sleeve slide along the first direction through the opening end and displace less than the second displacement distance, the protrusion does not interfere with the sleeve, and the signal elastic arm and the signal contact pin are misaligned with each other in view of the first direction.

In an embodiment, when the connector and the electronic device end are matched and connected along the first direction, the conductive contact pin forms the electrical connection with the conductive terminal, and then the sleeve interferes with the protrusion and drives the protrusion to inwardly push against the signal elastic arm, so that the signal elastic arm pushes against the signal contact pin to form the electrical connection.

In an embodiment, when the connector is detached from the electronic device end, the protrusion is separated from the interference with the sleeve in the first direction, and the signal elastic arm is released, so that the signal elastic arm is separated from the signal contact pin, and then the conductive elastic arm is separated from the interference with the conductive contact pin in the first direction, so that the conductive elastic arm is separated from the conductive contact pin.

In an embodiment, when a displacement distance of the connector detached from the electronic device end along the first direction is greater than zero but not greater than a difference between the second displacement distance and the first displacement distance, the protrusion is separated from the sleeve, and the signal elastic arm is released, so that the signal elastic arm is separated from the signal contact pin, and the conductive elastic arm and the conductive contact pin are maintained to interfere with each other in the first direction.

In an embodiment, when a displacement distance of the connector detached from the electronic device end along the first direction is greater than a difference between the second displacement distance and the first displacement distance, the conductive elastic arm is separated from the conductive contact pin in the first direction.

In an embodiment, the connector is further connected to a power supply system. The power supply system includes a controller configured to control an output voltage transmitted through the conductive terminal, wherein when the signal elastic arm is separated from the signal contact pin, and the conductive elastic arm and the conductive contact pin are maintained in the electrical connection, the controller steps down the output voltage or stops the output voltage.

In an embodiment, the power supply system further includes a power-off unit electrically connected to the controller, wherein when the signal elastic arm is separated from the signal contact pin, and the conductive elastic arm and the conductive contact pin are maintained in the electrical connection, the controller steps down the output voltage or stops the output voltage through the power-off unit.

In an embodiment, the power-off unit is at least one selected from the group consisting of a controller, an amplifier, a resistor and a capacitor.

In an embodiment, the power supply system further includes a switch element electrically connected to the controller, wherein when the signal elastic arm is separated from the signal contact pin, and the conductive elastic arm and the conductive contact pin are maintained in the electrical connection, the controller steps down the output voltage or stops the output voltage through the switch element.

In an embodiment, the switch element is a metal oxide semiconductor field effect transistor (MOSFET) or a bipolar junction transistor (BJT).

In an embodiment, the housing base includes an outer housing and an inner base, the outer housing covers the inner base, and the accommodation space is located in the inner base.

In an embodiment, the protrusion includes a first block and a second block spatially corresponding to each other, wherein the first block is elastically connected to the outer housing, protruded outwardly from the outer housing, and spatially corresponding to the sleeve of the electronic device end, wherein the second block is elastically connected to the inner base and spatially corresponding to the signal elastic arm, wherein when the first block interferes with the sleeve, the first block inwardly pushes against the second block, and then the signal elastic arm is driven by the second block to push against the signal contact pin.

In an embodiment, a distance formed between the conductive elastic arm and the opening end in the first direction is equal to a distance formed between the signal elastic arm and the opening end in the first direction.

In an embodiment, a distance formed between the protrusion and the opening end in the first direction is greater than a distance formed between the signal elastic arm and the opening end in the first direction.

In an embodiment, the connector is a USB Type-C connector.

In an embodiment, a distance formed between the protrusion and the opening end in the first direction is greater than a distance formed between the signal elastic arm and the opening end in the first direction.

In accordance with another aspect of the present disclosure, a connector is provided. The USB connector includes a housing base, a conductive terminal, a signal terminal and a protrusion. The housing base includes an accommodation space and an opening end. The conductive terminal is disposed in the accommodation space along a first direction, and includes a conductive elastic arm. The signal terminal is disposed in the accommodation space along the first direction and includes a signal elastic arm. The protrusion elastically is connected to the housing base, penetrating through the housing base, and spatially corresponding to the signal elastic arm. A distance formed between the protrusion and the opening end in the first direction is greater than a distance formed between the signal elastic arm and the opening end in the first direction.

In an embodiment, the conductive elastic arm and the signal elastic arm have a relative height difference in view of the first direction, and shifted in position along a second direction, wherein the second direction is perpendicular to the first direction.

In an embodiment, the protrusion includes a first block and a second block spatially corresponding to each other, wherein the first block is elastically connected to the housing base and protruded outwardly from the housing base, and the second block is elastically connected to the housing base and spatially corresponding to the signal elastic arm.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1A:
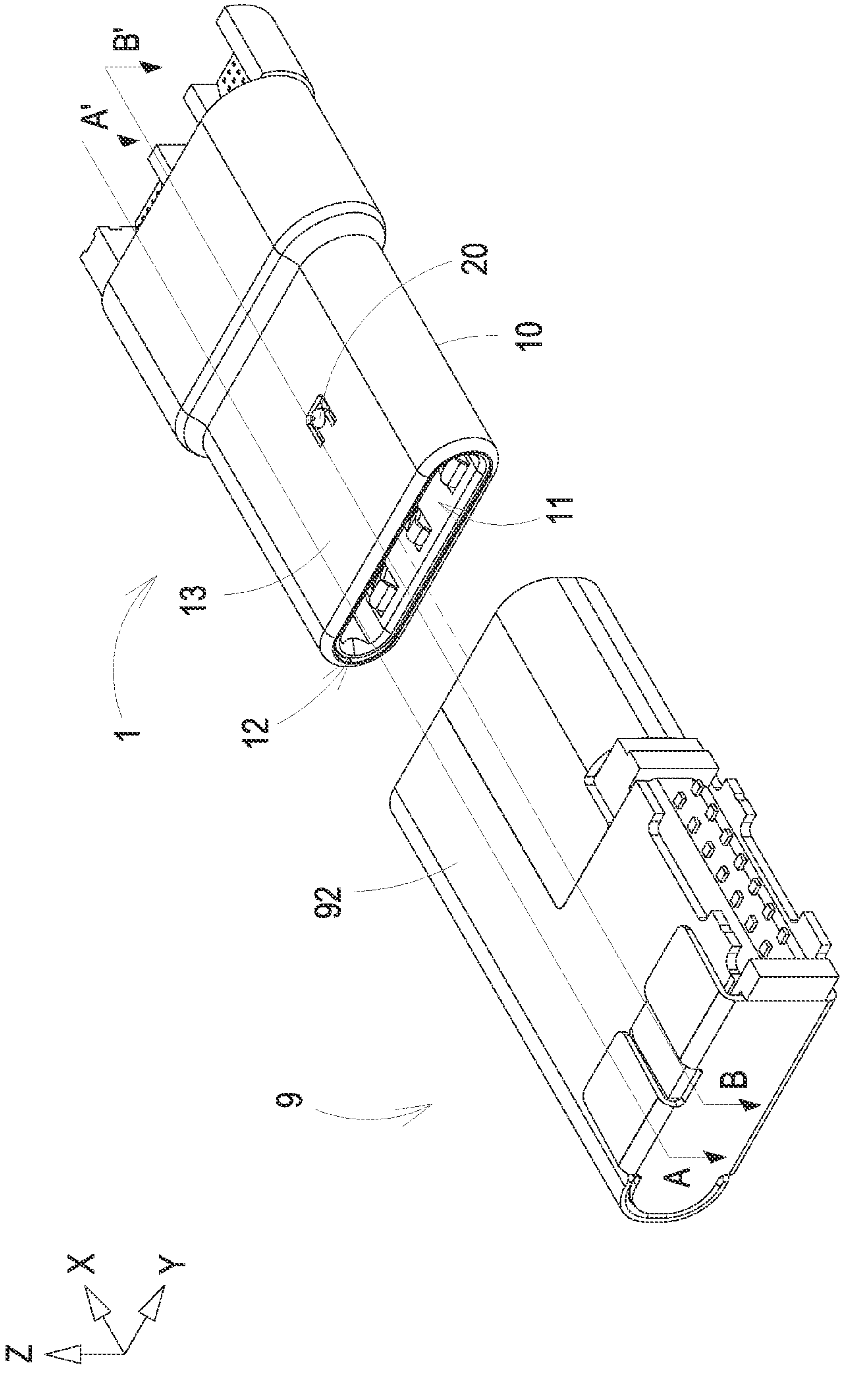
FIG. 1A is a perspective structural view illustrating a connector and an electronic device end detached from each other according to a first embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "inwardly," "outwardly," "upper," "lower" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments.

Figure 1B:
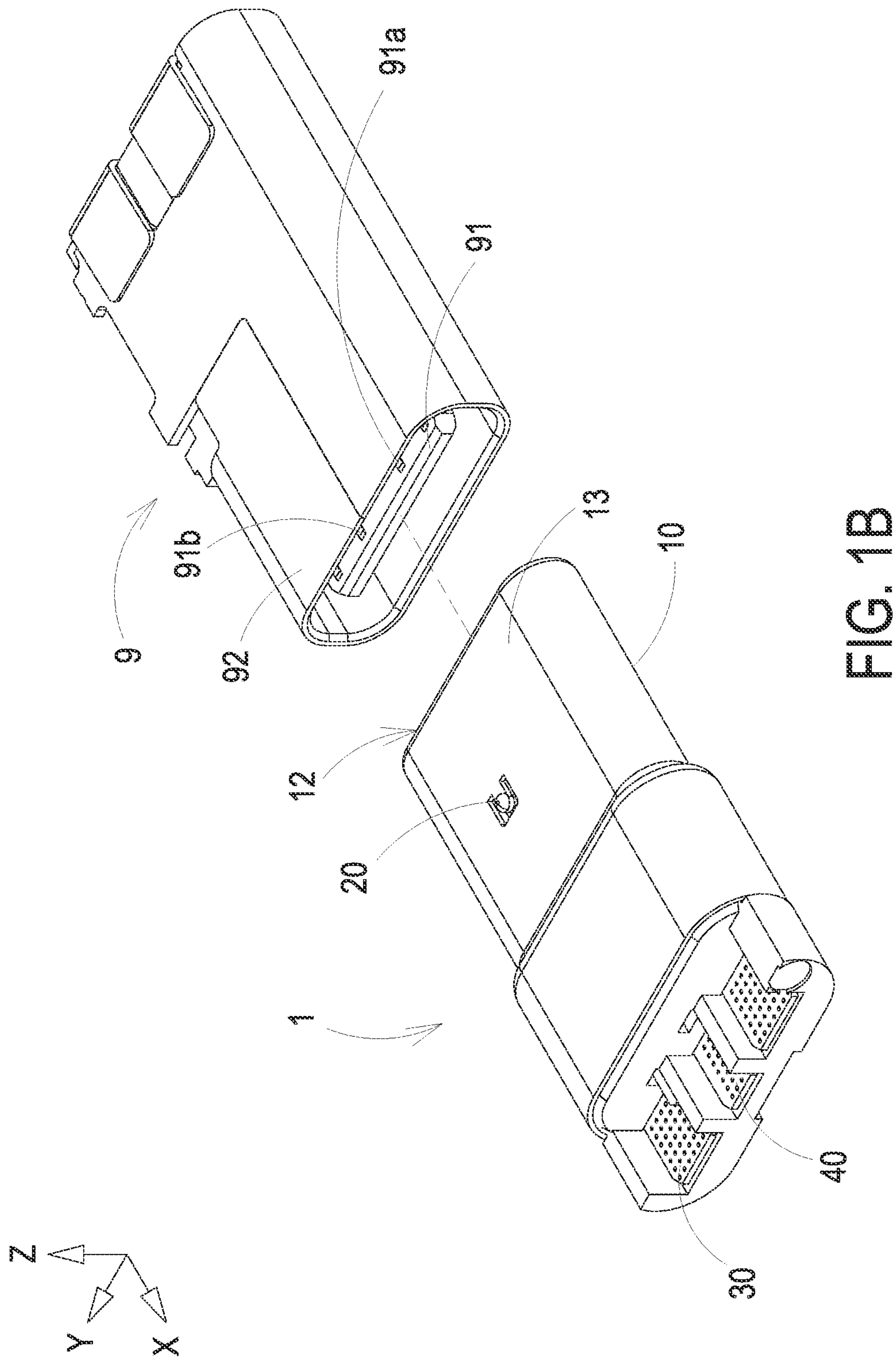
FIG. 1B is a perspective structural view illustrating the connector and the electronic device end detached from each other according to the first embodiment of the present disclosure and taken from another perspective.
Figure 2A:
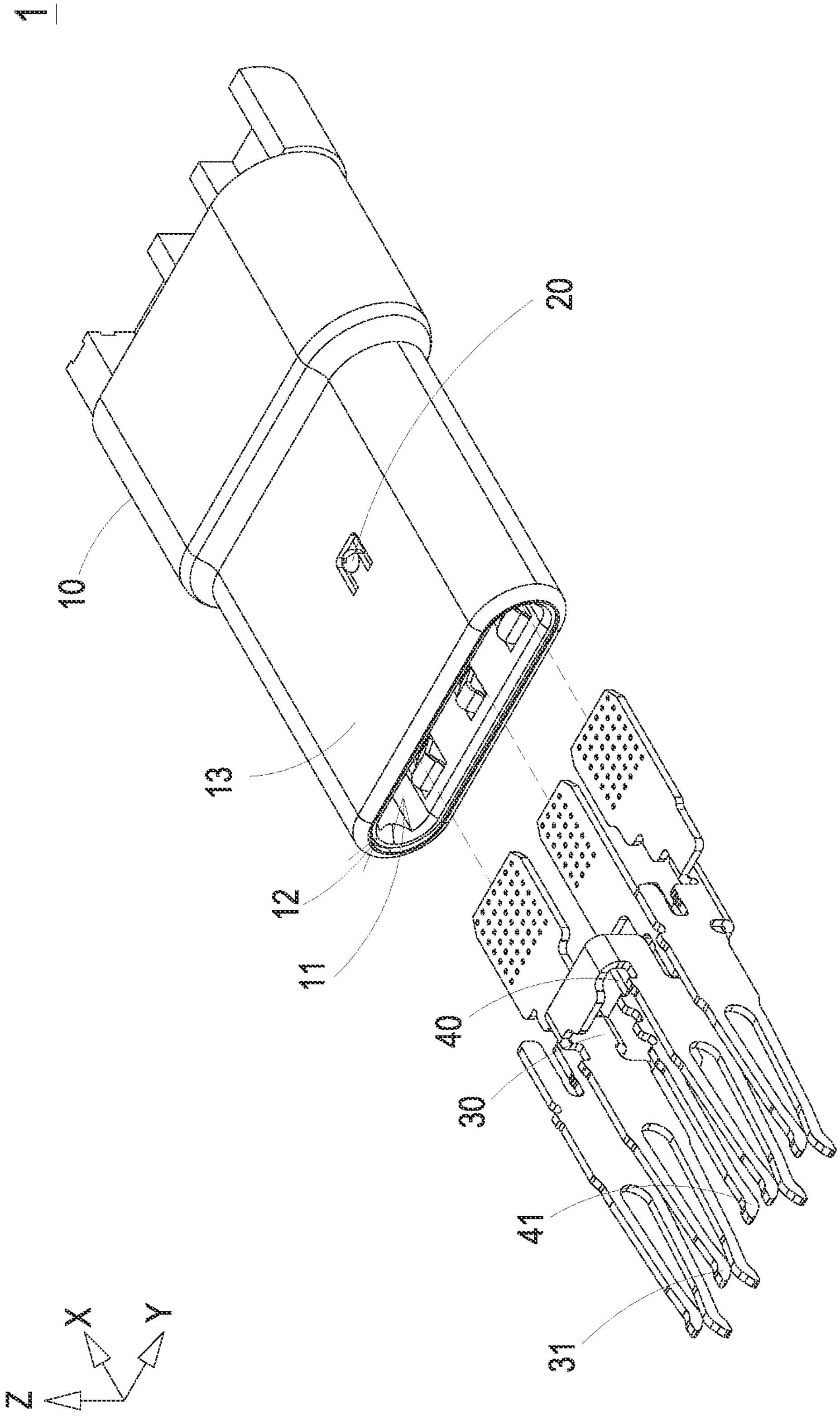
FIG. 2A is an exploded view illustrating the connector according to the first embodiment of the present disclosure.
Figure 2B:
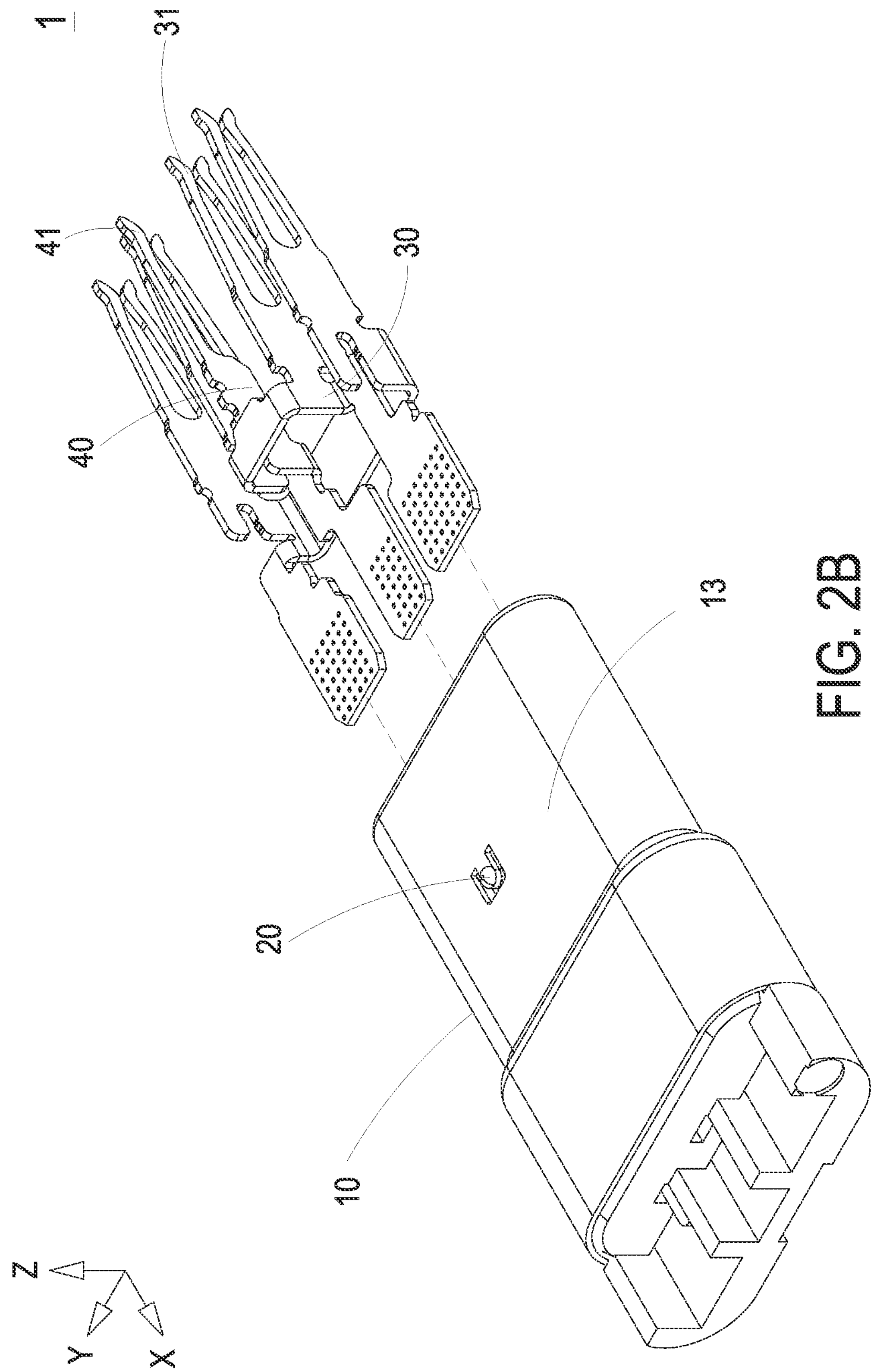
FIG. 2B is an exploded view illustrating the connector according to the first embodiment of the present disclosure and taken from another perspective.
Figure 3A:
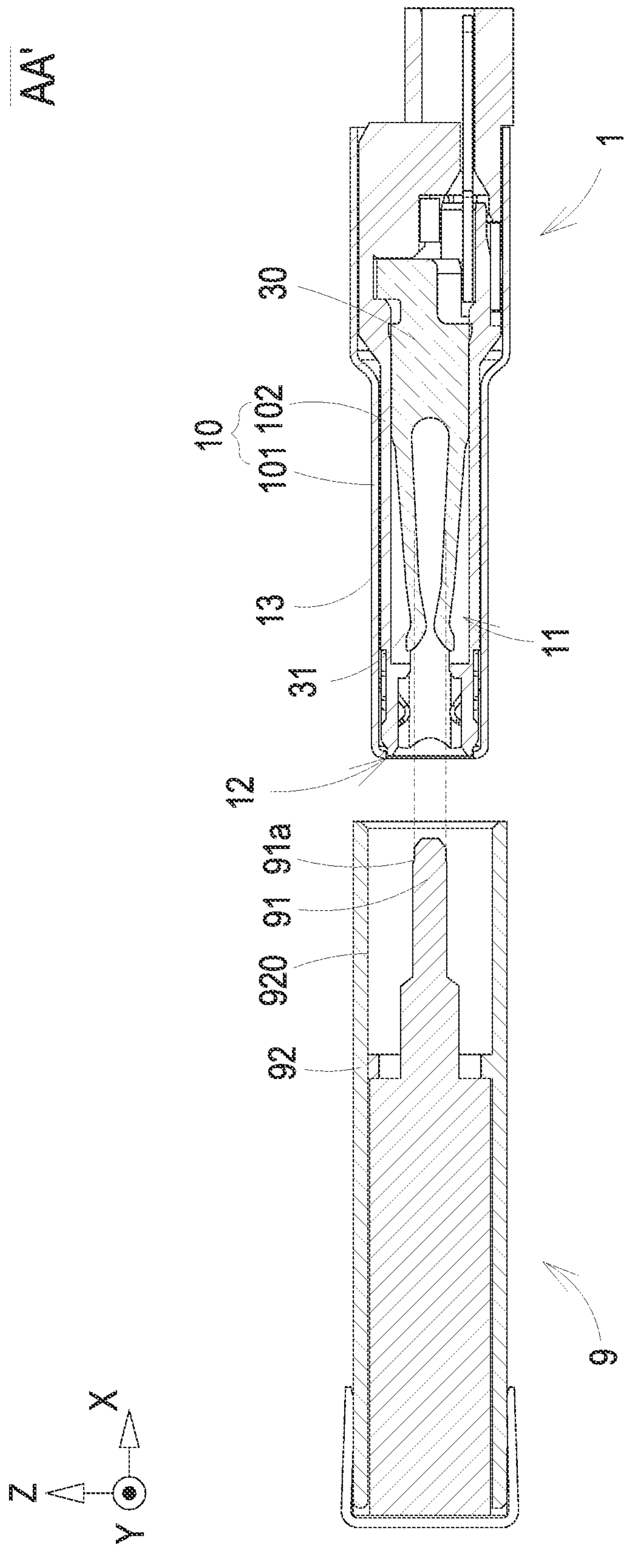
FIG. 3A is a cross-section view of FIG. 1A taken along the line $\overline{AA'}$ and corresponding to the conductive terminal.
Figure 3B:
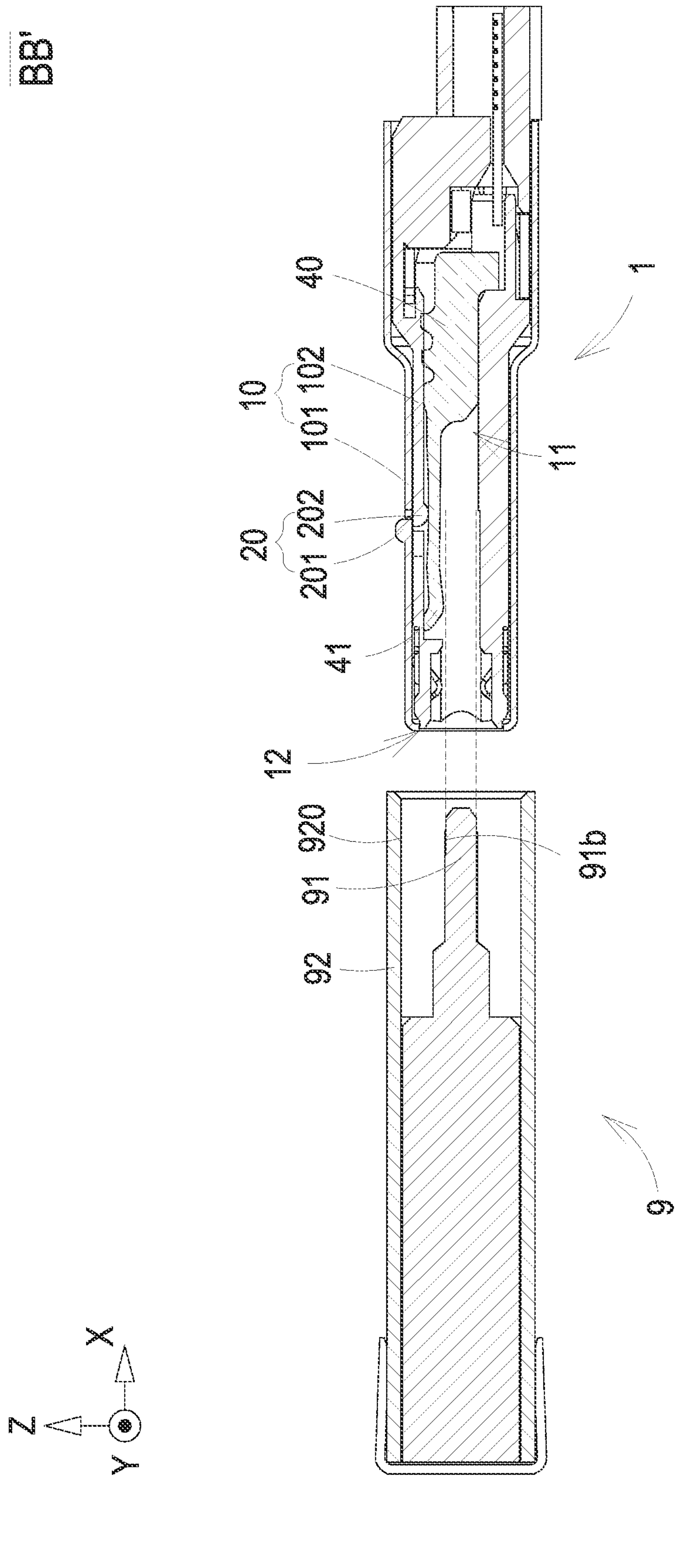
FIG. 3B is a cross-section view of FIG. 1A taken along the line $\overline{BB'}$ and corresponding to the signal terminal and the protrusion.
Figure 4:
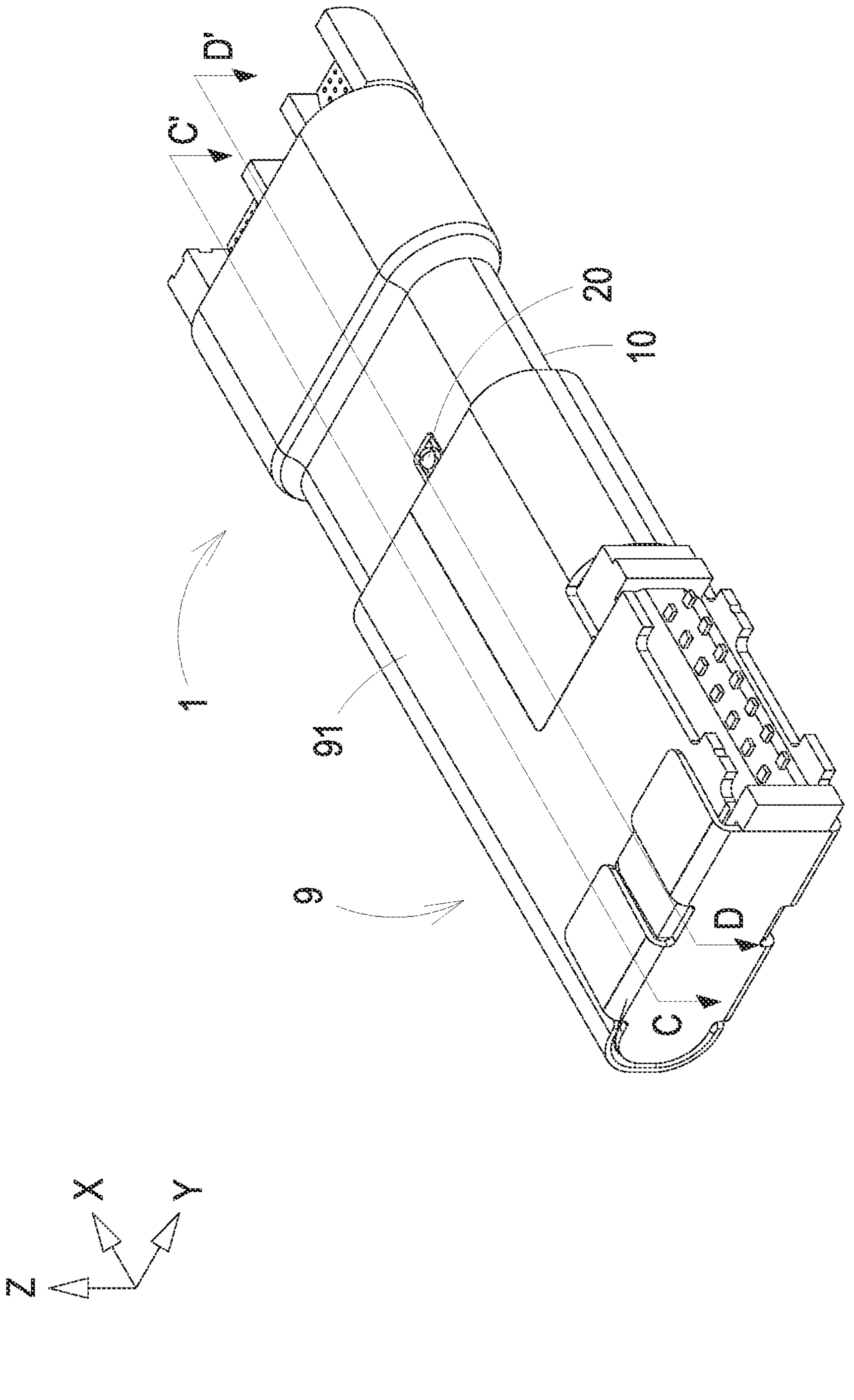
FIG. 4 is a perspective structural view illustrating the connector and the electronic device end in the unplugging operation according to the first embodiment of the present disclosure.
Figure 5A:
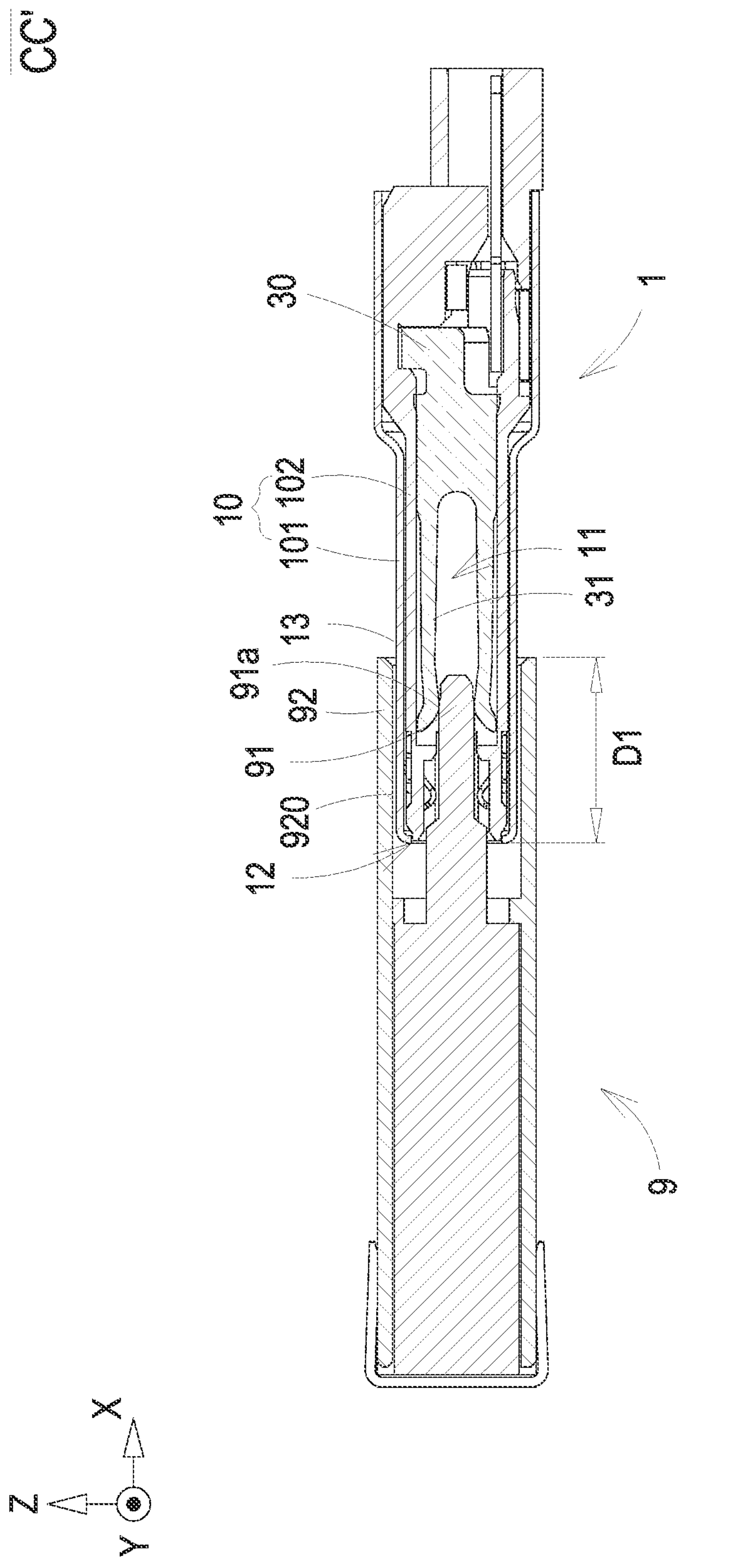
FIG. 5A is a cross-section view of FIG. 4 taken along the line $\overline{CC'}$ and corresponding to the conductive terminal.
Figure 5B:
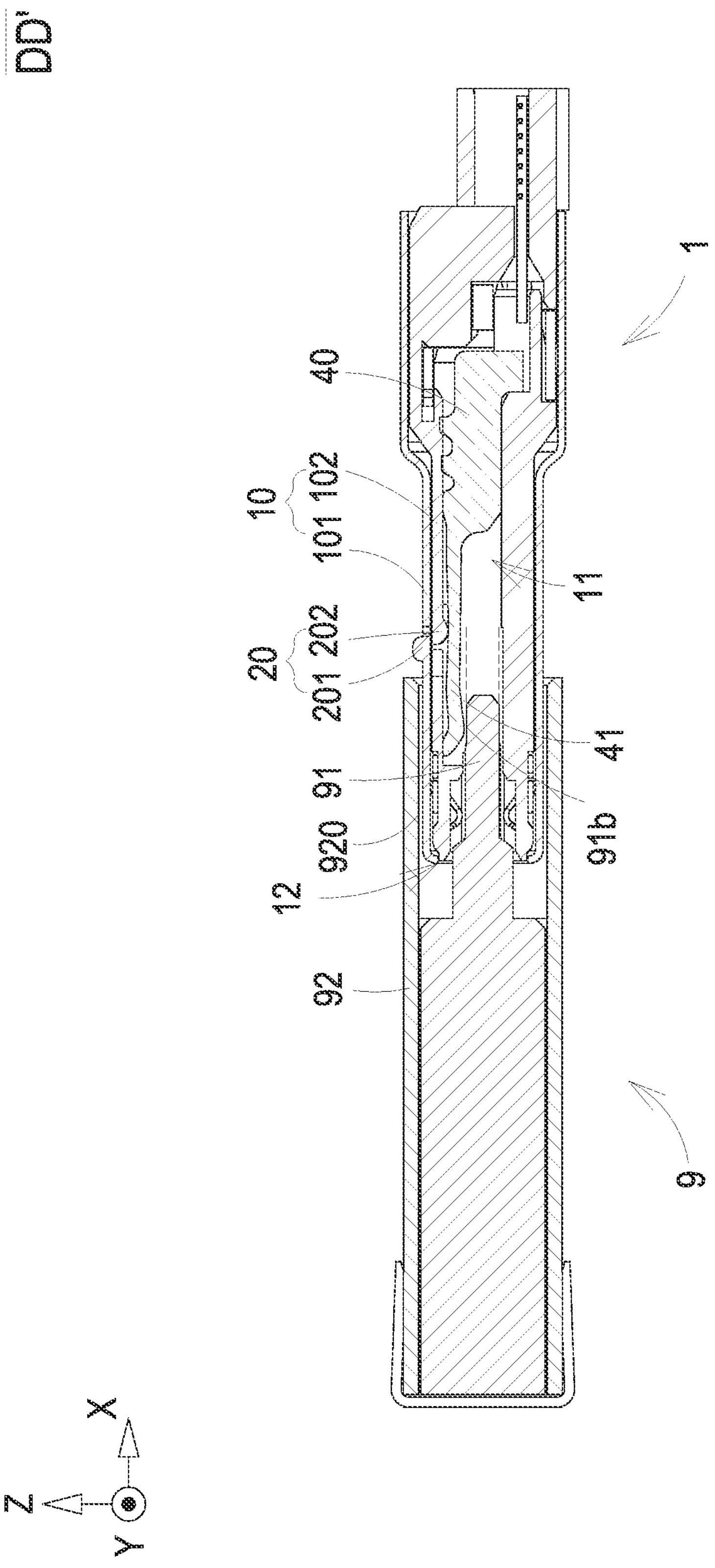
FIG. 5B is a cross-section view of FIG. 4 taken along the line $\overline{DD'}$ and corresponding to the signal terminal and the protrusion.
Figure 6:
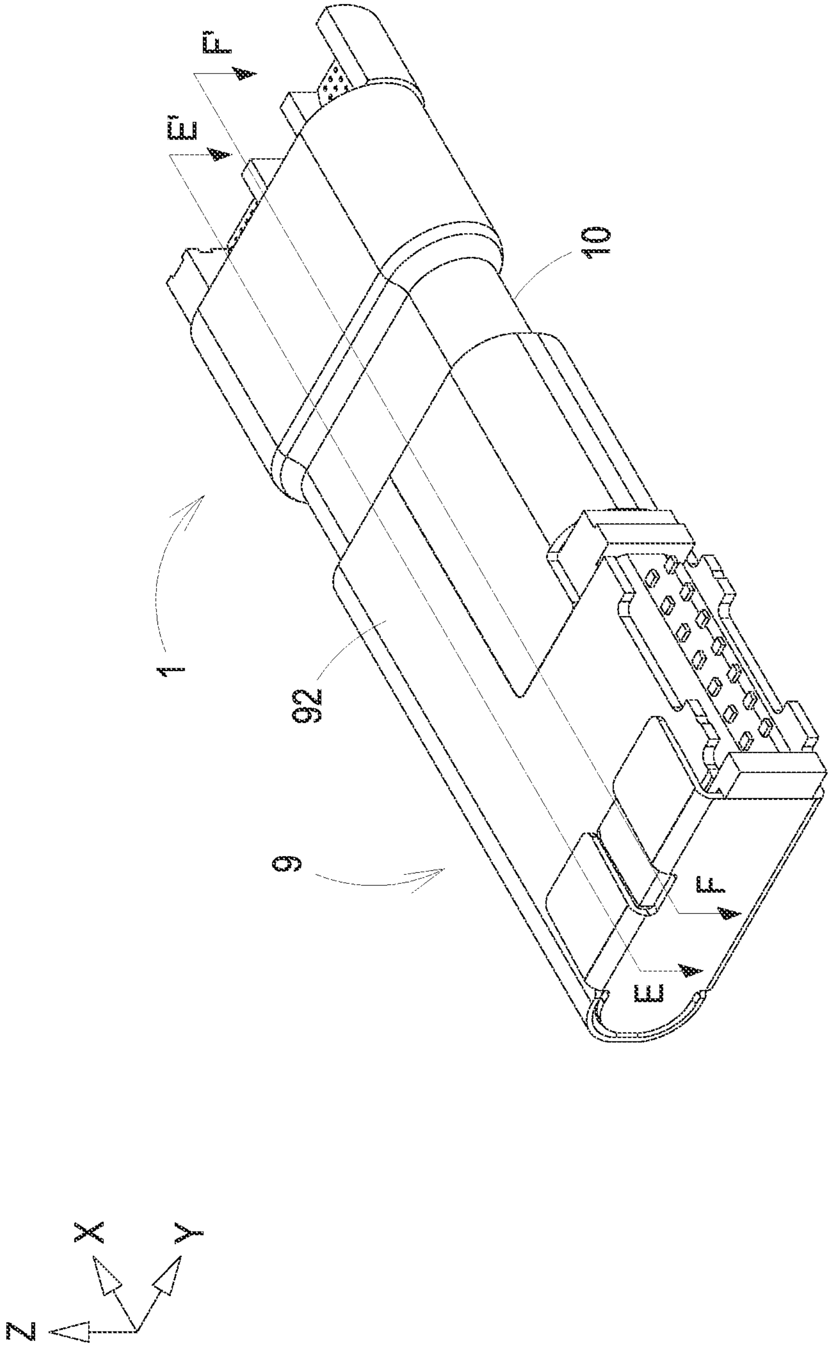
FIG. 6 is a perspective structural view illustrating the connector and the electronic device end connected with each other according to the first embodiment of the present disclosure.
Figure 7A:
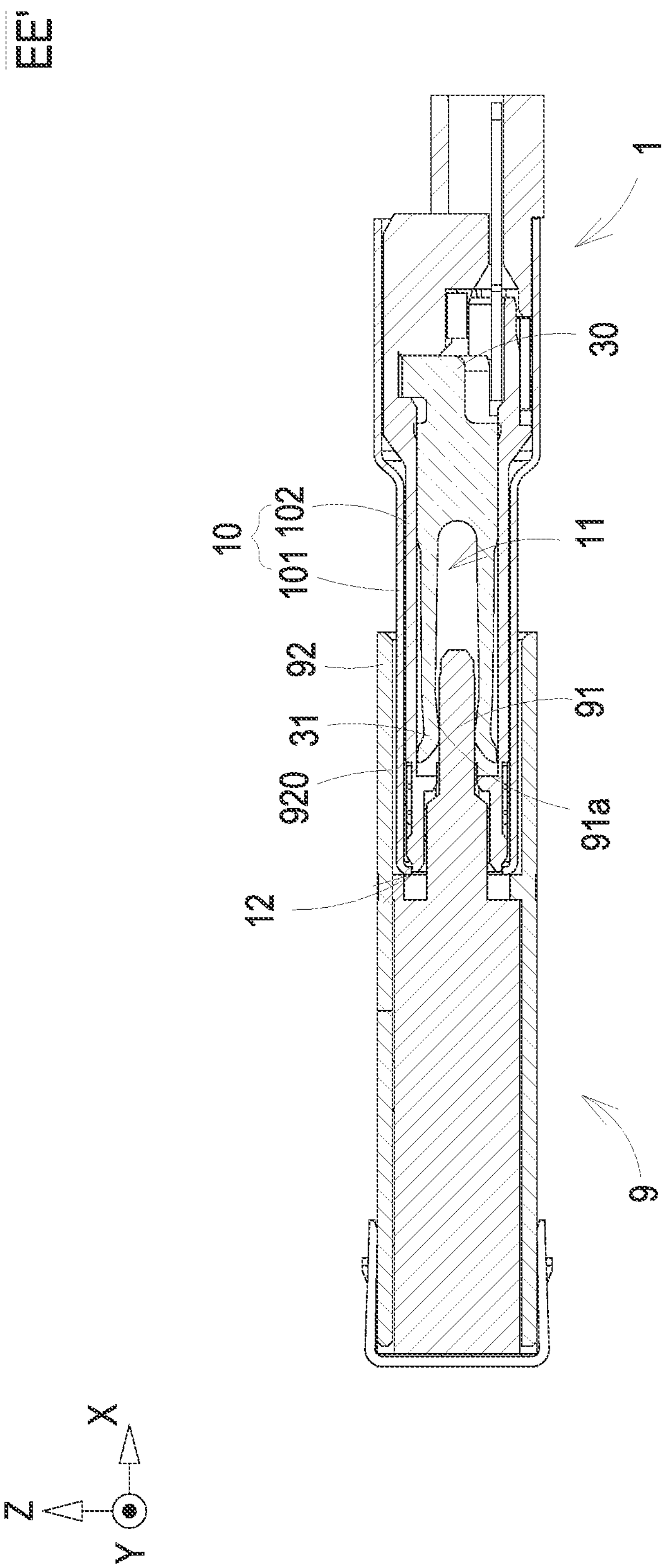
FIG. 7A is a cross-section view of FIG. 6 taken along the line $\overline{EE'}$ and corresponding to the conductive terminal.
Figure 7B:
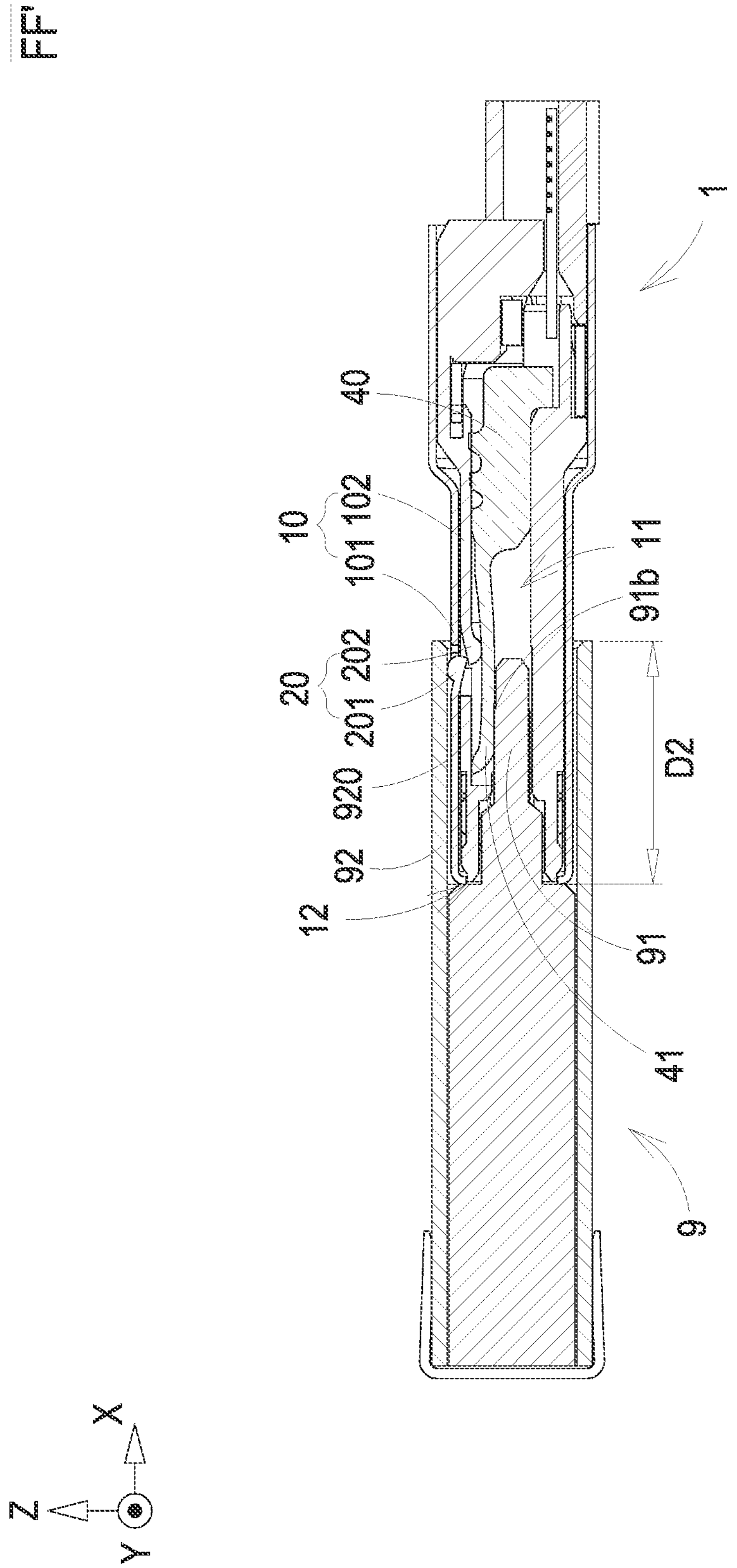
FIG. 7B is a cross-section view of FIG. 6 taken along the line $\overline{FF'}$ and corresponding to the signal terminal and the protrusion.

FIGS. 1A and 1B are perspective structural views illustrating a connector and an electronic device end detached from each other according to a first embodiment of the present disclosure. FIGS. 2A and 3B are exploded views illustrating the connector according to the first embodiment of the present disclosure. FIG. 3A is a cross-section view of FIG. 1A taken along the line $\overline{AA'}$ and corresponding to the conductive terminal. FIG. 3B is a cross-section view of FIG. 1A taken along the line $\overline{BB'}$ and corresponding to the signal terminal and the protrusion. FIG. 4 is a perspective structural view illustrating the connector and the electronic device end in the unplugging operation according to the first embodiment of the present disclosure. FIG. 5A is a cross-section view of FIG. 4 taken along the line $\overline{CC'}$ and corresponding to the conductive terminal. FIG. 5B is a cross-section view of FIG. 4 taken along the line $\overline{DD'}$ and corresponding to the signal terminal and the protrusion. FIG. 6 is a perspective structural view illustrating the connector and the electronic device end connected with each other according to the first embodiment of the present disclosure. FIG. 7A is a cross-section view of FIG. 6 taken along the line $\overline{EE'}$ and corresponding to the conductive terminal. FIG. 7B is a cross-section view of FIG. 6 taken along the line $\overline{FF'}$ and corresponding to the signal terminal and the protrusion. In the embodiment, the connector 1 is for example but not limited to a USB Type-C connector. Preferably but not exclusively, the connector 1 is used for matching and connecting with an electronic device, for example but not limited to computer, cellphone, power bank, having a USB Type-C interface along a first direction. The connector 1 can communicate with the electronic device in accordance with communication protocols, for example but not limited to PD (power delivery). The first direction is for example but not limited to the X axial direction. In other embodiments, the connector 1 is other different type of connectors with communication protocols. In the embodiment, the electronic device end 9 includes a plurality of contact pins and a sleeve. The plurality of contact pins are formed on a tongue 91 in the form of gold fingers, and at least include a conductive contact pin 91*a* and a signal contact pin 91*b*. Certainly, the present disclosure is not limited thereto. The sleeve 92 surrounds the plurality of contact pins. In the embodiment, the connector 1 includes a housing base 10, a conductive terminal 30, a signal terminal 40 and a protrusion 20. The housing base 10 is spatially corresponding to the plurality of contact pins and the sleeve 92 of the electronic device end 9. The housing base 10 includes an accommodation space 11 and an opening end 12. The accommodation space 11 is in communication with an exterior through the opening end 12. In the embodiment, the conductive terminal 30 is for example but not limited to the VBUS or GND conductive terminal. Preferably but not exclusively, the conductive terminal 30 is made of a metal sheet, set on the housing base 10 and disposed in the accommodation space 11. The conductive terminal 30 includes a conductive elastic arm 31 disposed along the first direction (i.e., the X axial direction). When the sleeve 92 of the electronic device end 9 sleeves on the housing base 10 through the opening end 12 along the first direction (i.e., the X axial direction) and slides a first displacement distance D1 (as shown in FIG. 5A), the plurality of contact pins of the electronic device end 9 are slid into the accommodation space 11 through the opening end 12, and a conductive contact pin 91*a* of the plurality of contact pins interferes with the conductive elastic arm 31 of the conductive terminal 30 in the first direction (i.e., the X axial direction), so as to form an electrical connection. Preferably but not exclusively, the signal terminal 40 is made by metal sheet, set on the housing base 10 and disposed in the accommodation space 11. The signal terminal 40 includes a signal elastic arm 41 disposed along the first direction (i.e., the X axial direction). The protrusion 20 is elastically connected to the housing base 10, penetrates through the housing base 10, and is spatially corresponding to the signal elastic arm 41 of the signal terminal 40. Preferably but not exclusively, the protrusion 20 is integrally formed on the housing base 10 into one piece. The protrusion 20 is disposed and corresponding to an opening or an aperture on the housing base 10. Preferably but not exclusively, the protrusion 20 penetrates through the opening or the aperture of the housing base 10, and is connected to the housing base 10 through a part of the lateral edge, so as to achieve the elastic support of the protrusion 20 on the housing base 10. The protrusion 20 is at least protruded from the outer surface of the housing base 10 and exposed out of the openings or the aperture. Preferably but not exclusively, the protrusion 20 is protruded from the two side surfaces of the housing base 10, respectively, and exposed out of the openings or the aperture. When the sleeve 92 of the electronic device end 9 passes through the opening end 12 of the connector 1 along the first direction (i.e., the X axial direction) and slides a second displacement distance D2 (as shown in FIG. 7B), the protrusion 20 of the connector 1 interferes with the inner wall of the sleeve 92 and inwardly pushes the signal elastic arm 41 of the signal terminal 40, so that the signal elastic arm 41 pushes against a signal contact pin 91*b* of the plurality of contact pins to form an electrical connection. The second displacement distance D2 is greater than the first displacement distance D1. Preferably but not exclusively, in the embodiment, the first displacement distance D1 is equal to the distance formed between the opening end 12 and the point where the conductive contact pin 91*a* and the conductive elastic arm 31 are interfered with each other along the first direction. The second displacement distance D2 is equal to the distance formed between the opening end 12 and the protrusion 20 along the first direction.

In the embodiment, each one of the plurality of contact pins of the electronic device end 9 has an identical shape and an identical size. Preferably but not exclusively, the plurality of contact pins are formed on a tongue 91 in the form of gold fingers on a printed circuit board, and at least include the conductive contact pin 91*a* corresponding to the conductive terminals 30 and the signal contact pin 91*b* corresponding to the signal terminal 40. The conductive contact pin 91*a* and the signal contact pin 91*b* formed on the tongue 91 are extended along the first direction (i.e., the X axial direction) and have the same horizontal height (in the Z axial direction). It is not an essential technical feature of the present disclosure, and not redundantly described hereafter.

Notably, when the plurality of contact pins and the sleeve 92 of the electronic device end 9 pass through the opening end 12 of the connector 1 along the first direction (i.e., the X axial direction), and displace less than the second displacement distance D2, the protrusion 20 of the connector 1 does not interfere with the sleeve 92 of the electronic device end 9. At this time, the signal elastic arm 41 of the signal terminal 40 and the signal contact pin 91*b* of the electronic device end 9 are misaligned with each other in view of the first direction (i.e., the X axial direction). Moreover, the signal elastic arm 41 and the signal contact pin 91*b* are shifted in position along the second direction (i.e., the Z axial direction), as shown in FIG. 5B, and the electrical connection is not formed. Moreover, when the plurality of contact pins and the sleeve 92 of the electronic device end 9 pass through the opening end 12 of the connector 1 along the first direction (i.e., the X axial direction), and displace greater than the first displacement distance D1 but less than the second displacement distance D2, the conductive elastic arm 31 of the connector 1 and the conductive contact pin 91*a* of the electronic device end 9 are interfered with each other, so as to the electrical connection is formed between the conductive terminal 30 and the conductive contact pin 91*a*. At this time, the signal elastic arm 41 of the connector 1 is misaligned with the plurality of contact pins in view of the first direction (i.e., the X axial direction). Namely, the signal elastic arm 41 and the signal contact pin 91*b* are shifted in position along the second direction (i.e., the Z axial direction), but not in contact with each other. In other words, in the plugging operation or unplugging operation of the connector 1 relative to the electronic device end 9, the conductive terminal 30 and the signal terminal 40 are controlled to achieve the electrical connection and disconnection at different timings.

In the embodiment, when the protrusion 20 does not interfere with the sleeve 92 in the first direction (i.e., the X axial direction), the conductive elastic arm 31 of the conductive terminal 30 and the signal elastic arm 41 of the signal terminal 40 have a relative height difference in view of the first direction. Namely, the conductive elastic arm 31 and the signal elastic arm 41 are shifted in position along the second direction (i.e., the Z axial direction). The second direction is perpendicular to the first direction. Preferably but not exclusively, in the embodiment, a distance formed between the conductive elastic arm 31 of the conductive terminal 30 and the opening end 12 in the first direction is equal to a distance formed between the signal elastic arm 41 of the signal terminal 40 and the opening end 12 in the first direction. Moreover, a distance formed between the protrusion 20 and the opening end 12 in the first direction is greater than a distance formed between the signal elastic arm 41 and the opening end 12 in the first direction. When the connector 1 and the electronic device end 9 are matched and connected along the first direction (i.e., the X axial direction), the plurality of contact pins of the electronic device end 9 pass through the opening end 12 of the connector 1, the conductive terminal 30 is in contact with the conductive contact pin 91*a* of the plurality of contact pins to form the electrical connection, firstly. Thereafter, the sleeve 92 passing through the opening end 12 is further interfered with the protrusion 20 and drives the protrusion 20 to inwardly push against the signal elastic arm 41, so that the signal elastic arm 41 of the signal terminal 40 pushes against the signal contact pin 91*b* to form the electrical connection. At this time, the protrusion 20 pushes against the signal elastic arm 41 along the second direction (i.e., the Z axial direction), so that the signal elastic arm 41 and the conductive elastic arm 31 are not shifted in position along the second direction.

In the embodiment, when the connector 1 is detached from the electronic device end 9, the protrusion 20 of the connector 1 is separated from the interference with the sleeve 92 of the electronic device end 9 in the first direction (i.e., the X axial direction), and the signal elastic arm 41 is released, so that the signal arm 41 is separated from the signal contact pin 91*b*. In that, the signal elastic arm 41 is separated from the interference with the signal contact pin 91*b* in the second direction, and the signal terminal 40 and the signal contact pin 91*b* are disconnected firstly. Thereafter, the conductive elastic arm 31 is separated from the interference with the conductive contact pin 91*a* in the first direction (i.e., the X axial direction), so that the conductive elastic arm 31 is separated from the conductive contact pin 91*b*. In that, the conductive terminal 30 is disconnected from the conductive contact pin 91*a* secondly.

Notably, when a displacement distance of the connector 1 detached from the electronic device end 9 along the first direction (i.e., the X axial direction) is greater than zero but not greater than a difference between the second displacement distance D2 and the first displacement distance D1, the protrusion 20 of the connector 1 is separated from the sleeve 92 of the electronic device end 9 in the first direction (i.e., the X axial direction), and the signal elastic arm 41 is released, so that the signal elastic arm 41 is separated from the signal contact pin 91*b*, and the conductive elastic arm 31 and the conductive contact pin 91*a* are maintained to interfere with each other in the first direction (i.e., the X axial direction). At this time, the signal terminal 40 is disconnected from the electronic device end 9, and the conductive terminal 30 and the electronic device end 9 are maintained in the electrical connection.

In addition, when the displacement distance of the connector 1 detached from the electronic device end 9 along the first direction is greater than the difference between the second displacement distance D2 and the first displacement distance D1, the conductive elastic arm 31 of the connector 1 is separated from the interference with the conductive contact pin 91*a* of the electronic device end 9 in the first direction (i.e., the X axial direction), so that the conductive elastic arm 31 is separated from the conductive contact pin 91*a*. At this time, the signal terminal 40 is disconnected from the electronic device end 9, and the conductive terminal 30 is disconnected form the electronic device end 9, too.

From the above, the protrusion 20 elastically connected with the housing base 10 of the connector 1 is utilized to control the disconnection sequences of the conductive terminal 30 and the signal terminal 40 with the plurality of contact pins of the electronic device end 9. When the connector 1 is pulled and separated from the plurality of contact pins of the electronic device end 9, the protrusion 20 moves back to the original position to release the signal terminal 40 firstly, and the conductive terminal 30 and the conductive contact pin 91*a* (VBUS and GND) of the electronic device end 9 are maintained in the electrical connection. At this time, it is allowed to step down or stop the voltage transmitted between the connector 1 and the electronic device end 9 in advance according to the signal disconnection. Thereafter, when the conductive terminal 30 and the conductive contact pin of the electronic device end 9 are separated and disconnected, the potential of the voltage transmitted between the conductive terminal 30 and the conductive contact pin 91*a* of the electronic device end 9 has been less than a certain degree. It has advantages of avoiding the occurrence of the electric arc during hot swapping, avoiding the formation of the carbon deposition due to the electric arc, prolonging the service life of the connector 1 and solving the safety problems in use. The step-down mechanism for the connector 1 and the electronic device end 9 is further described as follows.

Figure 8:
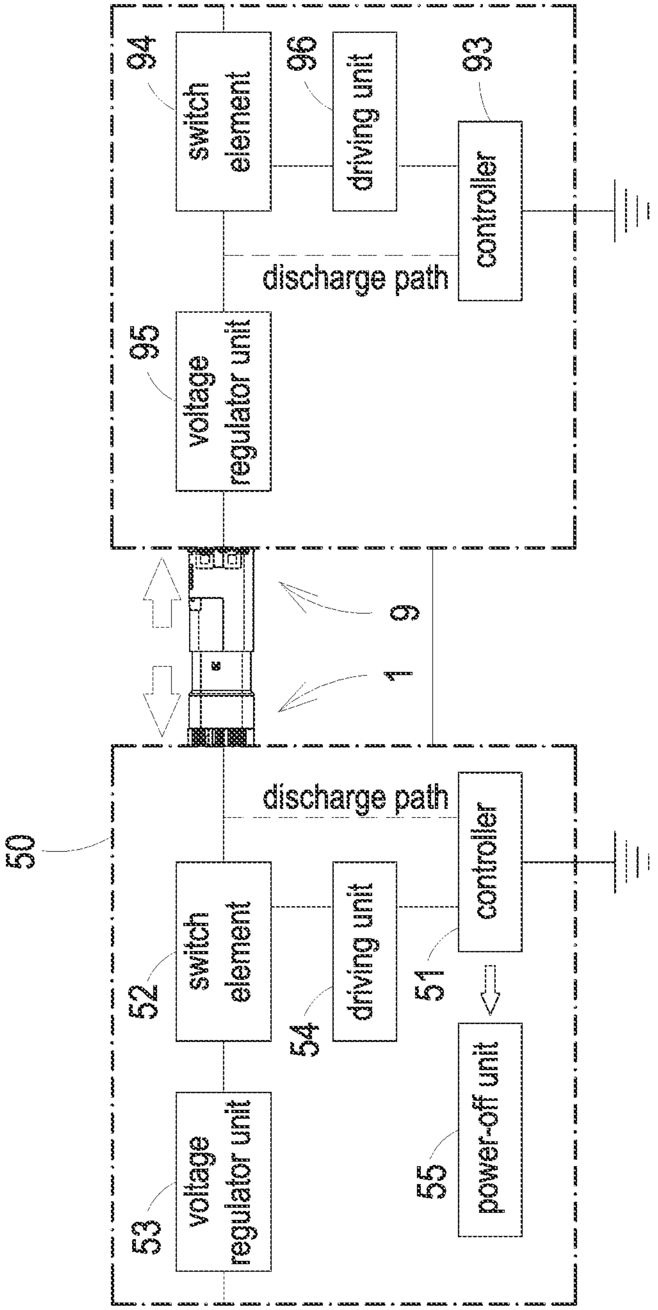
FIG. 8 is a block diagram showing a step-down mechanism for the connector and the electronic device end according to the first embodiment of the present disclosure.

FIG. 8 is a block diagram showing a step-down mechanism for the connector and the electronic device end according to the first embodiment of the present disclosure. Please refer to FIG. 1A to FIG. 8. In the embodiment, the connector 1 is connected to for example a power supply system 50, and an output voltage from the power supply system 50 is received by the electronic device end 9 through the connector 1. Preferably but not exclusively, the voltage output transmitted between the power supply system 50, such as a power supply device served as the source, and the electronic device end 9, such as computer and a mobile device served as the sink is performed based on the USB PD protocol. In this way, the power supply system 50 served as the source is allowed to provide different output voltages to the electronic device end 9 through the connection of the connector 1. In the embodiment, the power supply system 50 includes a controller 51, a switch element 52, a voltage regulator unit 53, a driving unit 54 and a power-off unit 55. The controller 51 is electrically connected to the switch element 52 through the driving unit 54, the switch element 52 is electrically connected to the voltage regulator unit 53, and the power-off unit is electrically connected to the controller 51. The controller 51 is allowed to control the switch element 52 through the driving unit 54, so as to transmit an output voltage, and the output voltage is transmitted to the electronic device end 9 through the connector 1. The stability of the output voltage is maintained by the voltage regulator unit 53. On the other hand, the electronic device end 9 includes a controller 93, a switch element 94, a voltage regulator unit 95 and a driving unit 96. The controller 93 is electrically connected to the switch element 94 through the driving unit 96, and the switch element 94 is electrically connected to the voltage regulator unit 95. The controller 93 is allowed to control the switch element 94 through the driving unit 96, so as to receive and transmit the output voltage from the connector 1.

Preferably but not exclusively, the connector 1 is a USB Type-C connector. The signal terminal 40 of the connector 1 is electrically connected to the controller 51, and the signal contact pin 91*b* of the electronic device end 9 is electrically connected to the controller 93. The connector 1 is allowed to output a communication message to the electronic device end 9 through the connection between the signal terminal 40 and the signal contact pin 91*b*. When the connector 1 is pulled away from the plurality of contact pins of the electronic device end 9, the displacement of the connector 1 relative to the electronic device end 9 is increased from the zero displacement of the complete connection. When a displacement distance of the connector 1 detached from the electronic device end 9 along the first direction (i.e., the X axial direction), is greater than zero but not greater than a difference between the second displacement distance D2 and the first displacement distance D1, the protrusion 20 of the connector 1 moves back to the original position to release the signal terminal 40, so that that the signal terminal 40 is disconnected from the electronic device end 9, while the conductive terminal 30 (VBUS and GND) and the conductive contact pain 91*a* of the electronic device end 9 are maintained in the electrical connection. At this time, the controller 51 of the power supply system 50 steps down the output voltage through the power-off unit 55 according to the message that the signal terminal 40 is disconnected from the electronic device end 9, so that the output voltage is discharged through a discharge path. In other embodiments, the output voltage is transmitted from the power supply system 50 to the electronic device end 9 through the connector 1 in a non-PD protocol. When the connector 1 is detached from the electronic device end 9 along the first direction (i.e., the X axial direction), and the protrusion 20 of the connector 1 moves back to the original position to release the signal terminal 40. In that, the signal terminal 40 is disconnected from the electronic device end 9, and the conductive terminal 30 and the conductive contact pin 91*a* of the electronic device end 9 are still maintained in the electrical connection. At this time, the controller 51 of the power supply system 50 stops the output voltage through the power-off unit 55 according to the message that the signal terminal 40 is disconnected from the electronic device end 9. Preferably but not exclusively, in the embodiment, the power-off unit 55 is at least one selected from the group consisting of a controller, an amplifier, a resistor and a capacitor. Preferably but not exclusively, the switch element 52 and the switch element 94 are a metal oxide semiconductor field effect transistor (MOSFET) or a bipolar junction transistor (BJT). In an embodiment, the power-off unit 55 of the connector 1 with PD protocol is omitted. When the protrusion 20 of the connector 1 moves back to the original position to release signal terminal 40 firstly, the signal terminal 40 is disconnected from the electronic device end 9, while the conductive terminal 30 (VBUS and GND) and the conductive contact pin 91*a* of the electronic device end 9 are maintained in the electrical connection. At this time, the controller 51 of the power supply system 50 is allowed to notify the driving unit 54 to turn off the switch element 52 according to the message that the signal terminal 40 is disconnected from the electronic device end 9 to step down the output voltage, so that the output voltage is discharged through the discharge path. Certainly, the present disclosure is not limited thereto. In other embodiments, the controller 93 of the electronic device end 9 is also allowed to notify the driving unit 96 to turn off the switch element 94 according to the message that the signal contact pin 91*b* is disconnected from the connector 1, so that an input voltage of the electronic device end 9 is discharged through a discharge path.

Figure 9:
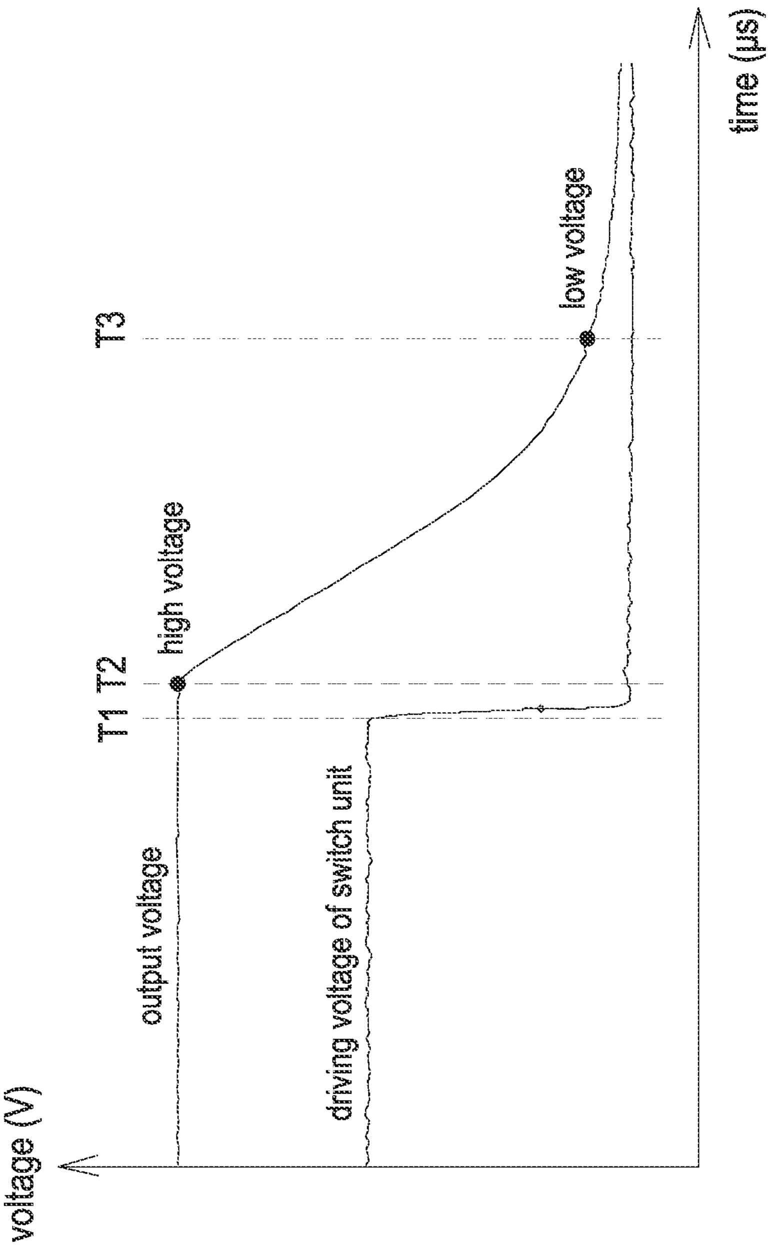
FIG. 9 is a diagram showing the relationship between voltages and timings in the step-down mechanism for the connector and the electronic device end according to the first embodiment of the present disclosure.

FIG. 9 is a diagram showing the relationship between voltages and timings in the step-down mechanism for the connector and the electronic device end according to the first embodiment of the present disclosure. In the embodiment, when the connector 1 is pulled away from the plurality of contact pins of the electronic device pin 9, the signal terminal 40 is disconnected from the electronic device end 9 at the timing T1, while the conductive terminal 30 is still electrically connected with the electronic device end 9. At this time, the controller 51 of the power supply system 50 connected to the connector 1 starts to control the output voltage to be stepped down at the timing T2 according to the message that the signal terminal 40 is disconnected from the electronic device end 9. The output voltage is stepped down from a high voltage such as 40V at timing T2, and reduced to a low voltage range such as less than 5V at timing T3. The time sequence from the timing T2 to the timing T3 is only a few microseconds (μs), which is much smaller than the displacement time of the connector 1 relative to the conductive contact pin 91*a* when the connector 1 is pulled out from the electronic device end 9. Therefore, in the present disclosure, the protrusion 20 elastically connected with the housing base 10 is utilized to control the disconnection sequences of the conductive terminal 30 and the signal terminal 40 with a plurality of contact pins of the electronic device end 9. When the connector 1 is pulled and separated from the plurality of contact pins of the electronic device end 9, the protrusion 20 moves back to the original position to release the signal terminal 40 firstly. In that, the signal terminal 40 is disconnected from the electronic device end 9, and the conductive terminal 30 and the conductive contact pin 91*a* of the electronic device end are maintained in the electrical connection. At this time, the controller 51 connected to the connector 1 controls the output voltage to be stepped down from the high voltage to the low voltage in a very short period according to the message of the signal disconnection. Subsequently, the conductive terminal 30 and the conductive contact pin 91*a* of the electronic device end 9 are separated and disconnected, the potential of the output voltage transmitted between the conductive terminal 30 and the conductive contact pin 91*a* of the electronic device end 9 has been less than a certain degree. It has advantages of avoiding the occurrence of the electric arc during hot swapping, avoiding the formation of the carbon deposition due to the electric arc, prolonging the service life of the connector 1 and solving the safety problems in use.

In addition, please refer to FIG. 1A to FIG. 7B. In the embodiment, the housing base 10 includes an outer housing 101 and an inner base 102. The outer housing 101 covers the inner base 102, and the accommodation space 11 is located in the inner base 102. In the embodiment, the protrusion 20 includes a first block 201 and a second block 202 spatially corresponding to each other. The first block 201 is elastically connected to the outer housing 101, protruded outwardly from the outer housing 101, and spatially corresponding to the sleeve 92 of the electronic device end 9. Preferably but not exclusively, the first block 201 is integrally formed on the outer housing 101 into one piece. The first block 201 is disposed and corresponding to an opening or an aperture on the outer housing 101. Preferably but not exclusively, the first block 201 penetrates through the opening or the aperture of the outer housing 101, and is connected to the outer housing 101 through a part of the lateral edge, so as to achieve the elastic support of the first block 201 on the outer housing 101. Preferably but not exclusively, the first block 201 is at least protruded from the outer surface of the outer housing 101 and exposed out of the openings or the aperture. In the embodiment, the second block 202 is elastically connected to the inner base 102 and spatially corresponding to the signal elastic arm 41. Preferably but not exclusively, the second block 202 is integrally formed on the inner base 102 into one piece. Preferably but not exclusively, the second block 202 is protruded inwardly from the inner base 102. The second block 202 is disposed and corresponding to an opening or an aperture on the inner housing 102. Preferably but not exclusively, the second block 202 penetrates through the opening or the aperture of the inner base 102, and is connected to the inner base 102 through a part of the lateral edge, so as to achieve the elastic support of the second block 202 on the inner base 102. Preferably but not exclusively, the second block 202 is at least protruded from the inner surface of the inner base 102 and exposed out of the openings or the aperture. In other embodiments, the second block 202 is an arm, which is elastically connected to the inner base 102, and extended horizontally without protruding vertically, so as to be exposed out of the openings or the aperture and have two opposite surfaces spatially corresponding to the first block 201 and the signal elastic arm 41. The present disclosure is not limited thereto. In the embodiment, when the sleeve 92 of the electronic device end 9 passes through the opening end 12 of the connector 1 along the first direction (i.e., the X axial direction) and slides the second displacement distance D2, the first block 201 of the connector 1 interferes with the sleeve 92, the first block 201 inwardly pushes against the second block 202. Moreover, the signal elastic arm 41 is driven by the second block 202 to push against the signal contact pin 91*b*, so that the electrical connection of the signal terminal 40 and the signal contact pin 91*b* is achieved. Certainly, in other embodiments, the forming manner of the housing base 10 and the protrusion 20 is adjustable according to the practical requirements. The present disclosure is not limited thereto.

Figure 10:
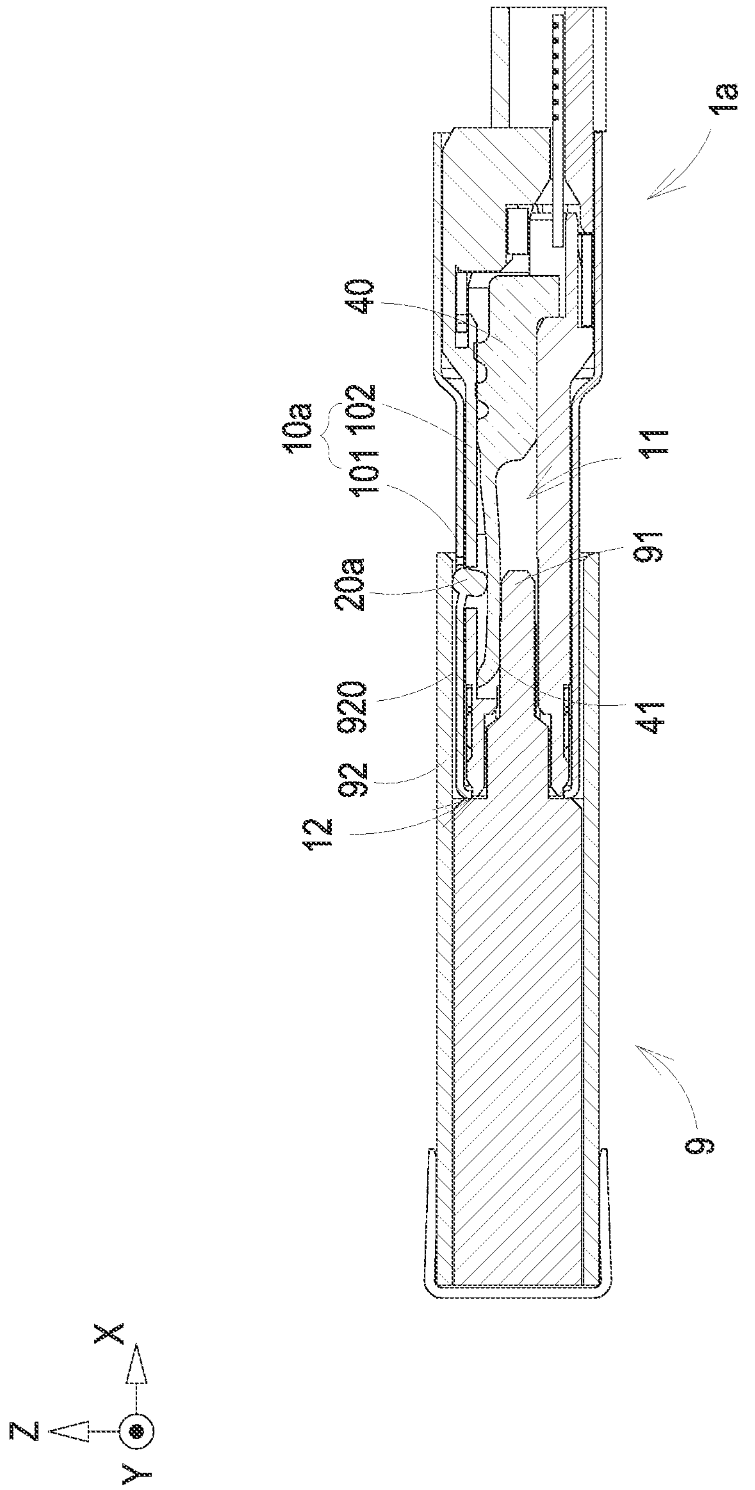
FIG. 10 is a cross-section view illustrating a connector and an electronic device end according to a second embodiment of the present disclosure.

FIG. 10 is a cross-section view illustrating a connector and an electronic device end according to a second embodiment of the present disclosure. In the embodiment, the structures, elements and functions of the connector 1*a* are similar to those of the connector 1 of FIG. 1A to FIG. 7B, and are not redundantly described herein. In the embodiment, the housing base 10*a* includes an outer housing 101 and an inner base 102. The outer housing 101 covers the inner base 102, and the accommodation space 11 is located in the inner base 102. In the embodiment, the protrusion 20*a* is integrally formed on the outer housing 101 into one piece. The protrusion 20*a* is disposed and corresponding to openings or apertures on the outer housing 101 and the inner base 102, and is connected to the outer housing 101 through a part of the lateral edge, so as to achieve the elastic support of the protrusion 20*a* on the outer housing 101. Preferably but not exclusively, the protrusion 20*a* is protruded outwardly from the outer housing 101 so as to spatially correspond to the sleeve 92 of the electronic device end 9. Moreover, the protrusion 20*a* is protruded inwardly and penetrates through the corresponding opening or the corresponding aperture of the inner base 102, so as to be exposed out of the corresponding aperture or the corresponding aperture, and spatially correspond to the signal elastic arm 41. In the embodiment, when the sleeve 92 of the electronic device end 9 passes through the opening end 12 of the connector 1 along the first direction (i.e., the X axial direction) and slides the second displacement distance D2, the protrusion 20*a* of the connector 1 interferes with the sleeve 92 of the electronic device end 9, the protrusion 20*a* inwardly pushes against the signal elastic arm 41, and the signal elastic arm 41 is driven by the protrusion 20*a* to push against the signal contact pin 91*b*, so that the electrical connection of the signal terminal 40 and the signal contact pin 91*b* is achieved. In an embodiment, the protrusion 20*a* is disposed on the inner base 102, and penetrates through the outer housing 101. Moreover, the protrusion 20*a* is spatially corresponding to the sleeve 92 of the electronic device end 9 and the signal elastic arm 41 disposed in the accommodation space 11. Through the action of the sleeve 92 of the electronic device end 9 being sleeved on the housing base 10*a*, the sleeve 92 is allowed to interfere with the protrusion 20*a*, and then the signal elastic arm 41 is driven by the protrusion 20*a* to push against the signal contact pin 91*b* to achieve the electrical connection. In another embodiment, the outer housing 101 and the inner base 102 of the housing base 10*a* are integrally formed. Preferably but not exclusively, the protrusion 20*a* is elastically connected to the housing base 10*a*, and spatially corresponding to the sleeve 92 of the electronic device end 9 and the signal elastic arm disposed in the accommodation space 11. When the sleeve 92 of the electronic device end 9 is sleeved on the shell base 10*a* through the open end 12, the sleeve 92 is allowed to interfere with the protrusion 20*a*, and the signal elastic arm 41 is driven by the protrusion 20*a* to push against the signal contact pin 91*b*, so as to achieve the electrical connection. In other words, the forming manner of the housing base 10*a* and the protrusion 20*a* is adjustable according to the practical requirements. The present disclosure is not limited thereto.

In summary, the present disclosure provides a connector. The protrusion elastically connected with the housing base is utilized to control the disconnection sequences of the conductive terminal and the signal terminal with the plurality of contact pins of the electronic device end. When the connector is pulled and separated from the plurality of contact pins of the electronic device end, the protrusion moves back to the original position to release the signal terminal firstly, and the conductive terminal (VBUS and GND) and the conductive contact pin of the electronic device end are maintained in the electrical connection. At this time, the power supply system connected to the connector controls the output voltage to be decreased or stops the output voltage in advance. When the conductive terminal and the conductive contact pin of the electronic device end are separated and disconnected, the potential of the output voltage transmitted between the conductive terminal and the conductive contact pin of the electronic device end has been less than a certain degree. It has advantages of avoiding the occurrence of the electric arc during hot swapping, avoiding the formation of the carbon deposition due to the electric arc, prolonging the service life of the connector and solving the safety problems in use. In addition, when the plurality of contact pins of the electronic device end are connected to the connector along the first direction, the electronic device end passes through the opening end of the connector and moves the first displacement distance and the second displacement distance to complete the electrical connections of the conductive terminal and the signal terminal, respectively. Since the first displacement distance is smaller than the second displacement distance, the conductive terminal is electrically connected with the conductive contact pin firstly, and then the signal terminal is electrically connected with the signal contact pin. On the contrary, when the connector is detached and separated from the electronic device end along the first direction, and the displacement distance of the connector relative to the electronic device end is greater than zero and less than the difference between the second displacement distance and the first displacement distance, the signal terminal is disconnected from the signal contact pin, and the conductive terminal is maintained in the electrical connection with the conductive contact pin of the electronic device end. At this time, the controller of the power supply system connected to the connector determines that the connector is in the unplugging operation according to the disconnection state of the signal terminal. Moreover, at the same time, the switch element or the power-off unit is controlled to step down the output voltage or stop the output voltage, so that the output voltage is discharged through the discharge path. Thereafter, when the separation distance is greater than the difference between the second displacement distance and the first displacement distance, the output voltage between the electronic device end and the connector has been stepped down from a high level to a low level, or the output voltage is stopped. With the output voltage at the low level or stopped, the conductive terminal and the conductive contact pin of the electronic device end are disconnected, and it is not easy to cause the electric arc. At the same time, it also avoids the formation of the carbon deposition due to the electric arc, so as to prolong the service life of the connector and solve the safety problems in use.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A connector for matching and connecting with an electronic device end, wherein the electronic device end comprises a plurality of contact pins and a sleeve, the sleeve is configured to surround the plurality of contact pins, and the connector comprises:

- a housing base, spatially corresponding to the plurality of contact pins and the sleeve of the electronic device end, wherein the housing base comprises an accommodation space and an opening end;
- a conductive terminal disposed in the accommodation space along a first direction, and comprising a conductive elastic arm, wherein when the sleeve sleeves on the housing base through the opening end along the first direction and slides a first displacement distance, the plurality of contact pins are slid into the accommodation space through the opening end, and a conductive contact pin of the plurality of contact pins interferes with the conductive elastic arm to form an electrical connection;
- a signal terminal disposed in the accommodation space along the first direction and comprising a signal elastic arm; and
- a protrusion elastically connected to the housing base, penetrating through the housing base, and spatially corresponding to the signal elastic arm, wherein when the sleeve passes through the opening end along the first direction and slides a second displacement distance, the protrusion interferes with the sleeve and inwardly pushes the signal elastic arm, so that the signal elastic arm pushes against a signal contact pin of the plurality of contact pins to form an electrical connection, wherein the second displacement distance is greater than the first displacement distance.

2. The connector according to claim 1, wherein when the plurality of contact pins and the sleeve slide along the first direction through the opening end and displace less than the second displacement distance, the protrusion does not interfere with the sleeve, and the signal elastic arm and the signal contact pin are misaligned with each other in view of the first direction.

3. The connector according to claim 2, wherein when the connector and the electronic device end are matched and connected along the first direction, the conductive contact pin forms the electrical connection with the conductive terminal, and then the sleeve interferes with the protrusion and drives the protrusion to inwardly push against the signal elastic arm, so that the signal elastic arm pushes against the signal contact pin to form the electrical connection.

4. The connector according to claim 1, wherein when the connector is detached from the electronic device end, the protrusion is separated from the sleeve in the first direction and the signal elastic arm is released, so that the signal elastic arm is separated from the signal contact pin, and then the conductive elastic arm is separated from the conductive contact pin in the first direction.

5. The connector according to claim 1, wherein when a displacement distance of the connector detached from the electronic device end along the first direction is greater than zero but not greater than a difference between the second displacement distance and the first displacement distance, the protrusion is separated from the sleeve and the signal elastic arm is released, so that the signal elastic arm is separated from the signal contact pin, and the conductive elastic arm and the conductive contact pin are maintained to interfere with each other in the first direction.

6. The connector according to claim 1, wherein when a displacement distance of the connector detached from the electronic device end along the first direction is greater than a difference between the second displacement distance and the first displacement distance, the conductive elastic arm is separated from the conductive contact pin in the first direction.

7. The connector according to claim 5, further connected to a power supply system, wherein the power supply system comprises a controller configured to control an output voltage transmitted through the conductive terminal, wherein when the signal elastic arm is separated from the signal contact pin, and the conductive elastic arm and the conductive contact pin are maintained in the electrical connection, the controller steps down the output voltage or stops the output voltage.

8. The connector according to claim 7, wherein the power supply system further comprises a power-off unit electrically connected to the controller, wherein when the signal elastic arm is separated from the signal contact pin, and the conductive elastic arm and the conductive contact pin are maintained in the electrical connection, the controller steps down the output voltage or stops the output voltage through the power-off unit.

9. The connector according to claim 8, wherein the power-off unit is at least one selected from the group consisting of a controller, an amplifier, a resistor and a capacitor.

10. The connector according to claim 7, wherein the power supply system further comprises a switch element electrically connected to the controller, wherein when the signal elastic arm is separated from the signal contact pin, and the conductive elastic arm and the conductive contact pin are maintained in the electrical connection, the controller steps down the output voltage or stops the output voltage through the switch element.

11. The connector according to claim 10, wherein the switch element is a metal oxide semiconductor field effect transistor (MOSFET) or a bipolar junction transistor (BJT).

12. The connector according to claim 1, wherein the housing base comprises an outer housing and an inner base, the outer housing covers the inner base, and the accommodation space is located in the inner base.

13. The connector according to claim 12, wherein the protrusion comprises a first block and a second block spatially corresponding to each other, wherein the first block is elastically connected to the outer housing, protruded outwardly from the outer housing, and spatially corresponding to the sleeve of the electronic device end, wherein the second block is elastically connected to the inner base, and spatially corresponding to the signal elastic arm, wherein when the first block interferes with the sleeve, the first block inwardly pushes against the second block, and then the signal elastic arm is driven by the second block to push against the signal contact pin.

14. The connector according to claim 1, wherein a distance formed between the conductive elastic arm and the opening end in the first direction is equal to a distance formed between the signal elastic arm and the opening end in the first direction.

15. The connector according to claim 1, wherein a distance formed between the protrusion and the opening end in the first direction is greater than a distance formed between the signal elastic arm and the opening end in the first direction.

16. The connector according to claim 1, wherein the connector is a USB Type-C connector.

17. The connector according to claim 1, wherein when the protrusion does not interfere with the sleeve, the conductive elastic arm and the signal elastic arm have a relative height difference in view of the first direction, and shifted in position along a second direction, wherein the second direction is perpendicular to the first direction.

18. A USB connector, comprising:

a housing base comprising an accommodation space and an opening end;

a conductive terminal disposed in the accommodation space along a first direction, and comprising a conductive elastic arm;

a signal terminal disposed in the accommodation space along the first direction and comprising a signal elastic arm; and a protrusion elastically connected to the housing base, penetrating through the housing base, and spatially corresponding to the signal elastic arm, wherein a distance formed between the protrusion and the opening end in the first direction is greater than a distance formed between the signal elastic arm and the opening end in the first direction.

19. The USB connector according to claim 18, wherein the conductive elastic arm and the signal elastic arm have a relative height difference in view of the first direction, and shifted in position along a second direction, wherein the second direction is perpendicular to the first direction.

20. The USB connector according to claim 18, wherein the protrusion comprises a first block and a second block spatially corresponding to each other, wherein the first block is elastically connected to the housing base and protruded outwardly from the housing base, and the second block is elastically connected to the housing base and spatially corresponding to the signal elastic arm.

* * * * *